United States Patent
Lavi et al.

(10) Patent No.: US 12,535,596 B2
(45) Date of Patent: Jan. 27, 2026

(54) PROVIDING AN ACCURATE LOCATION FOR A GNSS DEVICE IN URBAN ENVIRONMENTS

(71) Applicant: Tupaia Ltd., Ramat-Hasharon (IL)

(72) Inventors: Nadav Lavi, Ramat-Hasharon (IL); Kobi Scheim, Pardess-Hanna (IL)

(73) Assignee: Tupaia Ltd., Ramat-Hasharon (IL)

( * ) Notice: Subject to any disclaimer, the term of this patent is extended or adjusted under 35 U.S.C. 154(b) by 525 days.

(21) Appl. No.: 17/167,761

(22) Filed: Feb. 4, 2021

(65) Prior Publication Data
US 2021/0239849 A1    Aug. 5, 2021

Related U.S. Application Data

(60) Provisional application No. 62/970,188, filed on Feb. 5, 2020.

(51) Int. Cl.
*G01S 19/41* (2010.01)
*G01S 19/07* (2010.01)

(52) U.S. Cl.
CPC ............ *G01S 19/41* (2013.01); *G01S 19/071* (2019.08)

(58) Field of Classification Search
CPC ...... G01S 19/04; G01S 19/071; G01S 19/073; G01S 19/28; G01S 19/41; G01S 19/43
See application file for complete search history.

(56) References Cited

U.S. PATENT DOCUMENTS

| | | | |
|---|---|---|---|
| 2007/0200755 A1* | 8/2007 | Hamilton | G01S 19/41 342/357.24 |
| 2009/0051590 A1* | 2/2009 | Pitt | G01S 19/28 342/357.42 |

(Continued)

FOREIGN PATENT DOCUMENTS

| | | | |
|---|---|---|---|
| CN | 108265713 A | * | 7/2018 |
| JP | 6637214 B1 | * | 1/2020 |

(Continued)

OTHER PUBLICATIONS

N. Hayashi, Augmentation of GPS with a Barometer and a Heading Rate Gyroscope for Urban Vehicular Navigation, Master of Science Thesis, Department of Geomatics Engineering, The University of Calgary (Year: 1996).*

(Continued)

*Primary Examiner* — Robert W Hodge
*Assistant Examiner* — Fred H Mull
(74) *Attorney, Agent, or Firm* — M&B IP Analysts, LLC

(57) ABSTRACT

A system and method for providing an accurate position for a GNSS device in an urban environment. The method includes determining a correction model based on differencing data and visibility data received from a plurality of sensors, estimating a current location of the GNSS device, deriving satellite parameters of a set of best visible satellites based at least on the determined correction model and the estimated current location, determining an accurate position of the GNSS device based on derived satellite parameters of the set of best visible satellites and a current location measurement provided by a GNSS receiver in the GNSS device, and setting a location of the GNSS device based on the accurate position.

17 Claims, 8 Drawing Sheets

(56) References Cited

U.S. PATENT DOCUMENTS

2012/0059578 A1* 3/2012 Venkatraman .......... G01S 19/28
701/411
2021/0396889 A1* 12/2021 Yoshino .................. G01S 19/28

FOREIGN PATENT DOCUMENTS

KR          101229129 B1 *  2/2013
KR       20180005492 A  *  1/2018

OTHER PUBLICATIONS

L. Wang et al., Smart Device-Supported BDS/GNSS Real-Time Kinematic Positioning for Sub-Meter-Level Accuracy in Urban Location-Based Services, Sensors 2016, 16, 2201, 15 pages (Year: 2016).*

Definition for such as, The American Heritage Dictionary of Idioms (2nd ed.). Houghton Mifflin. https://search.credoreference.com/articles/Qm9va0FydGljbGU6MzExOTE3NQ==?aid=279753 (Year: 2013).*

\* cited by examiner

PROVIDING AN ACCURATE LOCATION FOR A GNSS DEVICE IN URBAN ENVIRONMENTS

CROSS-REFERENCE TO RELATED APPLICATIONS

This application claims the benefit of U.S. Provisional Application No. 62/970,188 filed on Feb. 5, 2020, the contents of which are hereby incorporated by reference.

TECHNICAL FIELD

The present disclosure relates generally to a method and a system to select a subset of satellites for GNSS-RTK settings out of a list of observed satellites to better control environmental errors.

BACKGROUND

A satellites-based positioning system relies on signals transmission from satellites that propagate through the atmosphere layers and reach an end user receiver. Besides imperfections existing onboard the satellites transmission system, two major atmosphere elements, Troposphere and Ionosphere, affect the signal propagation by hindering the propagation. These elements and their impact are widely documented in the literature. Also, Ionosphere and Troposphere affect differently the signals code phase and carrier phase—which are common measurements in nowadays Global Navigation Satellite System (GNSS) receivers.

Furthermore, obstacles (e.g., building, bridges, hilly terrains, and so on) at the users' close vicinity induce additional delays to the satellites' signals that further diverge the signal propagation from a vacuum-like clear line-of-sight (LOS) propagation condition. With the receivers' close vicinity propagation conditions, there is a common clear differentiation between open-sky conditions, where the receiver has a single direct propagation path to all visible satellites, and obstructed sky visibility conditions, for example in hilly terrain, urban canyon, and so on.

From a propagation channel perspective, however, three typical cases are found: (a) line-of-sight similar to open sky model, (b) multipath (MP) channels model, where a line of sight signal element exists combined with non-direct signal echoes (that can induce errors by misleading the delay estimation in both code or phase) and (c) non-line-of-sight (NLOS) channels model, where a direct propagating signal element hardly exist (by hardly it is meant that a receiver is able to detect this signal component with very low probability). The two later cases ((b) and (c)) clearly pose errors with larger magnitude and naturally are considered more complex to correct.

Overall, a positioning solution needs to address: (a) satellite originated errors, (b) Ionosphere and Troposphere induced errors, along with (c) errors due to receiver's close vicinity environment. This is very difficult as the MP error is a result of the surrounding environment which varies in space and time. It is important to note that the urban environment is even more complex for GNSS based positioning as the sky visibility is limited due to buildings and street geometry which might reduce the number of concurrently visible satellites to less than a minimal required set of four satellites. This element of urban canyon scenario is not resolvable by propagation errors correction.

High accuracy positioning applications exist in various industries (e.g., surveying, agriculture), and lately in transportation (e.g., self-driving cars, drones). Some automotive applications require precise position solution to the order of few tens of centimeters (e.g., vehicle lane centering targets accuracy better than 30 cm). The entry level of receivers' capabilities in these cases would be multi constellation (e.g., GPS (US), Galileo (UE), BeiDou (China), Glonass (Russia) to name a few) with (at least) dual frequency (typically L1+L2 or recently noted L1+L5). Atop improving the hardware, receivers are integrated with external source of corrections to overcome the induced errors along the signal propagation path.

One approach to improve GNSS positioning solution is known as real time kinematics (RTK) which is available in the market. With this approach, two receivers exchange carrier phase information in real-time, such that both receivers (usually termed as base and rover) are locked on the received satellites carrier phases concurrently. This allows to remove most of the Ionosphere, Troposphere and satellites originated errors to a sub 10 cm level of accuracy and assist in deriving relative distances between the base (which is typically a static station) and the rover (this solution can be termed as relative positioning). Knowledge on the exact base location enables the calculation of the absolute rover position. RTK is superior in terms of accuracy to another existing service noted by precise point positioning (PPP), explained below.

However, in RTK the performance degrades as the distance between the base and the rover grows, where practical distances are below 5 km. Additionally, RTK solutions are very sensitive to MP channels. RTK systems raise also scaling issues for large set of rover receivers, due to the requirement of continuous communication between the rover and the base and therefore is limited to only few receivers per operation. PPP based solutions are removing the satellites' and atmosphere associated errors listed above using different external data sources based on a nation or global scale network of high-end equipped ground stations collecting and analyzing the satellites received signals. Correction is derived based on the ground-based network and are either conducted in real-time or post measurement.

Several correction data sources exist in the market to form a variety of PPP solutions. The most known correction sources (which are also free of cost) are those provided by NASA, Continuously Operating Reference Station (CORS) and ESA, and include exact orbits, clock biases, differential clock biases (between pairs of satellites), Ionospheric delays, and Tropospheric delays. The corrections are provided with substantial delay (in the order of days) and are suitable for post processing purposes and non-real-time applications. Another errors correction service with similar approach to PPP is provided by satellite-based augmentation system (SBAS).

The SBAS service is attractive as it is handed for free, it is a real time service, and it is embedded within the GNSS bands so no additional hardware for reception and decoding is needed. The underlined purpose of the SBAS system is to assure signal integrity which also improves accuracy to the level 1 m 1sigma. Commercial real time correction services also exist and are typically available in the form of proprietary protocol structure, (e.g., Trimble RTX product). This type of service is tightly coupled to the companies offered equipment and provides premium performance.

A commercial service is based on a network of ground based owned, installed and operated equipment by a service provider with typical inter-site distance of 10-100 km. The sites (also known as reference stations (RS)) collect real time measurements and calculate the local sites error elements, repeatedly. Collecting the data for several RSs in an area further enables generating an artificial RS corrections model as if an RS exists within a user's proximity. This approach is termed: VRS (Virtual reference station). The corrections are available to an end user by dedicated communication links (e.g., UHF), internet IP protocol through cellular wireless links, or by dedicated satellite broadcast service globally (non-GNSS satellite).

The above-described method of local corrections extraction and wide area distribution requires receivers integrated with PPP corrections handling capability (i.e., decoding and integration with the receiver calculation engines). PPP is considered to reach an accuracy level of few centimeters in open-sky conditions. Introduction of dual frequency receivers has opened another opportunity in improving receivers' accuracy autonomously. Namely, receivers are utilizing the measured data on multiple channels to remove external error sources, particularly Ionospheric errors.

Another Ionospheric removal scheme known as 'Ionospheric free linear combination' takes the code and/or phase observables and mix them with proper scaling by the carrier frequency to remove the Ionospheric delay. This method alone is considered not sufficient for high accuracy application but the combination of it with the approaches introduced can assist in reaching the accuracy level requirement per application.

The above introduced methods has increasingly improved GNSS receiver's accuracy in a large variety of applications with open-sky visibility conditions by reducing the accumulated errors along the signal propagation path. However, a major challenge that stays to date un-touched is correcting the close vicinity interferences effect associated particularly with urban environment (e.g., urban canyon).

This challenge concerns upcoming applications such as semi-autonomous and fully autonomous vehicle driving as well as active safety derivatives rising in vehicle-to-vehicle (V2V) communication and its variants use cases (e.g., vehicle to infrastructure (V2I) etc.) and Intelligent Transportation System (ITS) requirements. The challenge posed in the urban environment targets three principal elements: (a) overcoming propagation errors, (b) bad satellites visibility and (c) provisioning of service to multiple users.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing an accurate position for a GNSS device in an urban environment. The method includes determining a correction model based on differencing data and visibility data received from a plurality of sensors, estimating a current location of the GNSS device, deriving satellite parameters of a set of best visible satellites based at least on the determined correction model and the estimated current location, determining an accurate position of the GNSS device based on derived satellite parameters of the set of best visible satellites and a current location measurement provided by a GNSS receiver in the GNSS device, and setting a location of the GNSS device based on the accurate position.

Certain embodiments disclosed herein also include a non-transitory computer readable medium having stored thereon causing a processing circuitry to execute a process, the process includes determining a correction model based on differencing data and visibility data received from a plurality of sensors, estimating a current location of the GNSS device, deriving satellite parameters of a set of best visible satellites based at least on the determined correction model and the estimated current location, determining an accurate position of the GNSS device based on derived satellite parameters of the set of best visible satellites and a current location measurement provided by a GNSS receiver in the GNSS device, and setting a location of the GNSS device based on the accurate position.

Certain embodiments disclosed herein also include a system for providing an accurate position for a GNSS device in an urban environment. The system includes a processing circuitry; and a memory, the memory containing instructions that, when executed by the processing circuitry, configure the system to determine a correction model based on differencing data and visibility data received from a plurality of sensors, estimate a current location of the GNSS device, derive satellite parameters of a set of best visible satellites based at least on the determined correction model and the estimated current location, determine an accurate position of the GNSS device based on derived satellite parameters of the set of best visible satellites and a current location measurement provided by a GNSS receiver in the GNSS device, and set a location of the GNSS device based on the accurate position.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
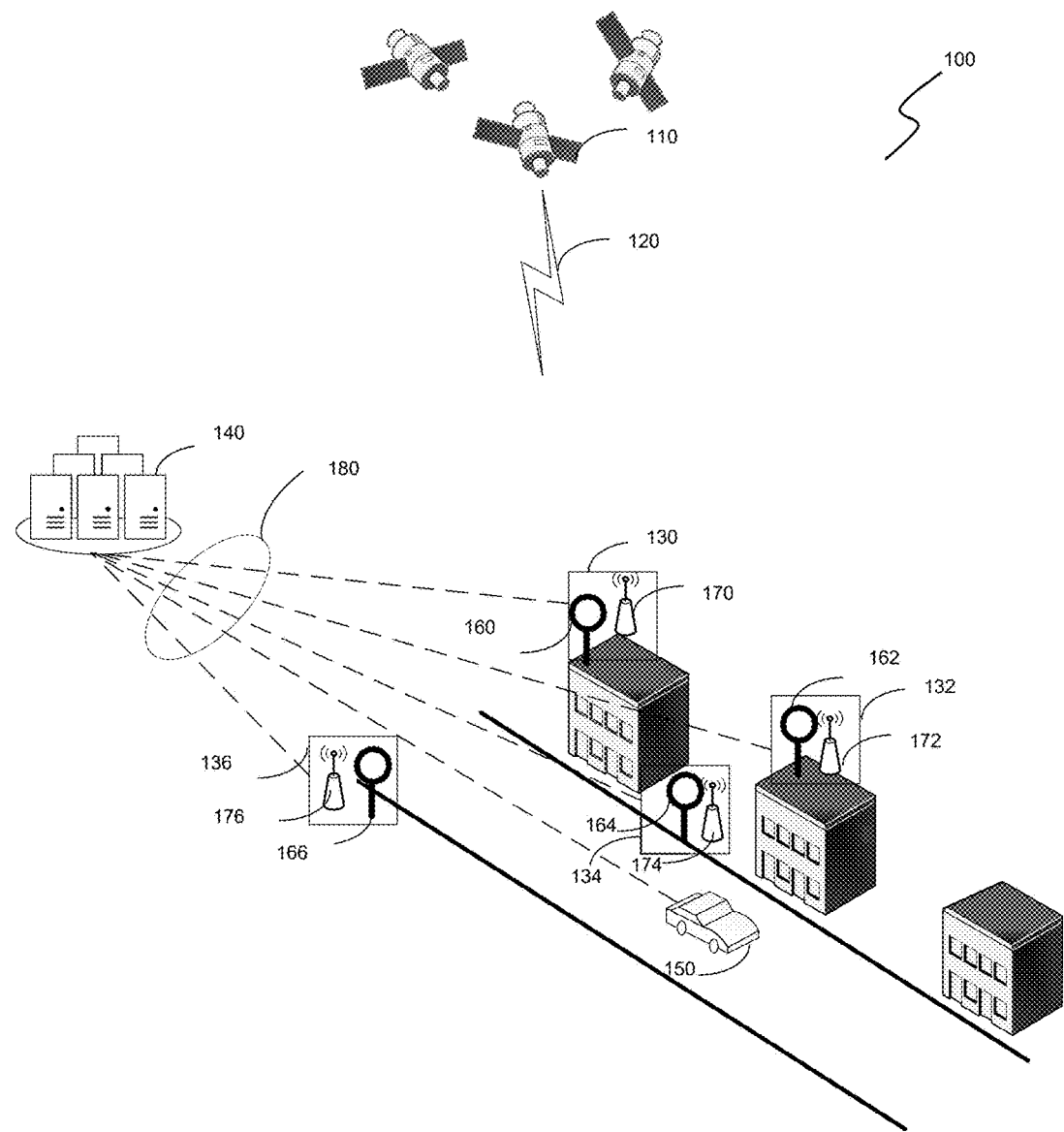
FIG. 1 is an example system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for correcting signal errors that are accumulated along the GNSS signal propagation path within GNSS receivers. The corrections include high and low altitude originated errors correction and close-vicinity receiver-originated errors correction. The correction of the two errors are implemented by ground-based sensors having onboard GNSS receivers that are separated into two segments. The first segment includes sensors that are mounted on the city rooftops where only a limited number of such sensors are required (e.g., in the magnitude of few to tens of sensors for a city coverage). The second segment includes street level sensors that sense the satellites' constellation visibility and satellites' street level reception conditions to select a best set of visible satellites to a receiver in close proximity to a one or more stationary sensors. The stationary sensors include street level sensors. In an embodiment, the system also implements a method of generating RTK solution is also generated that scales up with multiple mobile receivers within an environment.

That is, a system and method for correcting errors within GNSS receivers global navigation satellites system (GNSS) receivers are disclosed. The errors include satellites errors, atmosphere errors, and close vicinity-induced receiver errors. Generated corrections addressing these error sources are provisioned in two separated components, including raw measurements space and best-visible satellites set that are combined at the receiver to compensate for the measurement errors in the GNSS signal, and avoid inaccurate measurements that affect the receiver in a traditional GNSS-RTK setting.

FIG. 1 shows an example system 100 utilized to describe the various disclosed embodiments. The system 100 includes a space-based element and a ground-based element. The space-based element includes a constellation of satellites 110 orbiting in space that transmit Global Navigation Satellite System (GNSS) signals 120. The ground-based element of the system 100 includes: rooftop mounted sensors 130, 132, street level mounted sensors 134, 136, computing center 140, and GNSS device 150 equipped with a GNSS receiver.

The above-mentioned sensors 130, 132, 134, 136 may appear as a dedicated sensing station or cell towers, micro cells, Femto or Pico cells, hotspots, internet kiosk and the like. In an embodiment, the GNSS device 150 may be a vehicle traveling over a city road with buildings along the side of the road. The sensors 130, 132, 134, 136, which may include cellular towers, include transceivers 160, 162, 164, 166 and GNSS sensors 170, 172, 174, 176 respectively. All the ground-based element entities are connected to the computing center 140 by either wireless communication (e.g., microwave, cellular, etc.) or wired communication (e.g., copper based, fiber optic, etc.), or combination of several technologies indicated by the dashed lines 180.

In an embodiment, the sensors 130, 132, 134, and 136 include GNSS sensors 170, 172, 174, 176 that are configured to support multi-frequency and multi-constellation capability, and provide raw measurements in code and carrier phases, as well as other measurements such as signal-to-noise ratio, doppler, and so on. Also, the sensors 130, 132, 134, 136 are also configured to have computing and local memory functions.

In FIG. 1, the GNSS device 150 is illustrated as a vehicle, yet GNSS devices are used for various applications, and thus the GNSS device 150 can be any type of computing device with GNSS capabilities, such as: mobile phones, tablets, laptops, smart watches, cellular base-stations, e-scooters, e-bikes, various types of sensors and Internet of Things (IoT) devices (for example temperature and humidity sensor), traffic lights, digital signages, information kiosks, drones, and the like.

Figure 2:
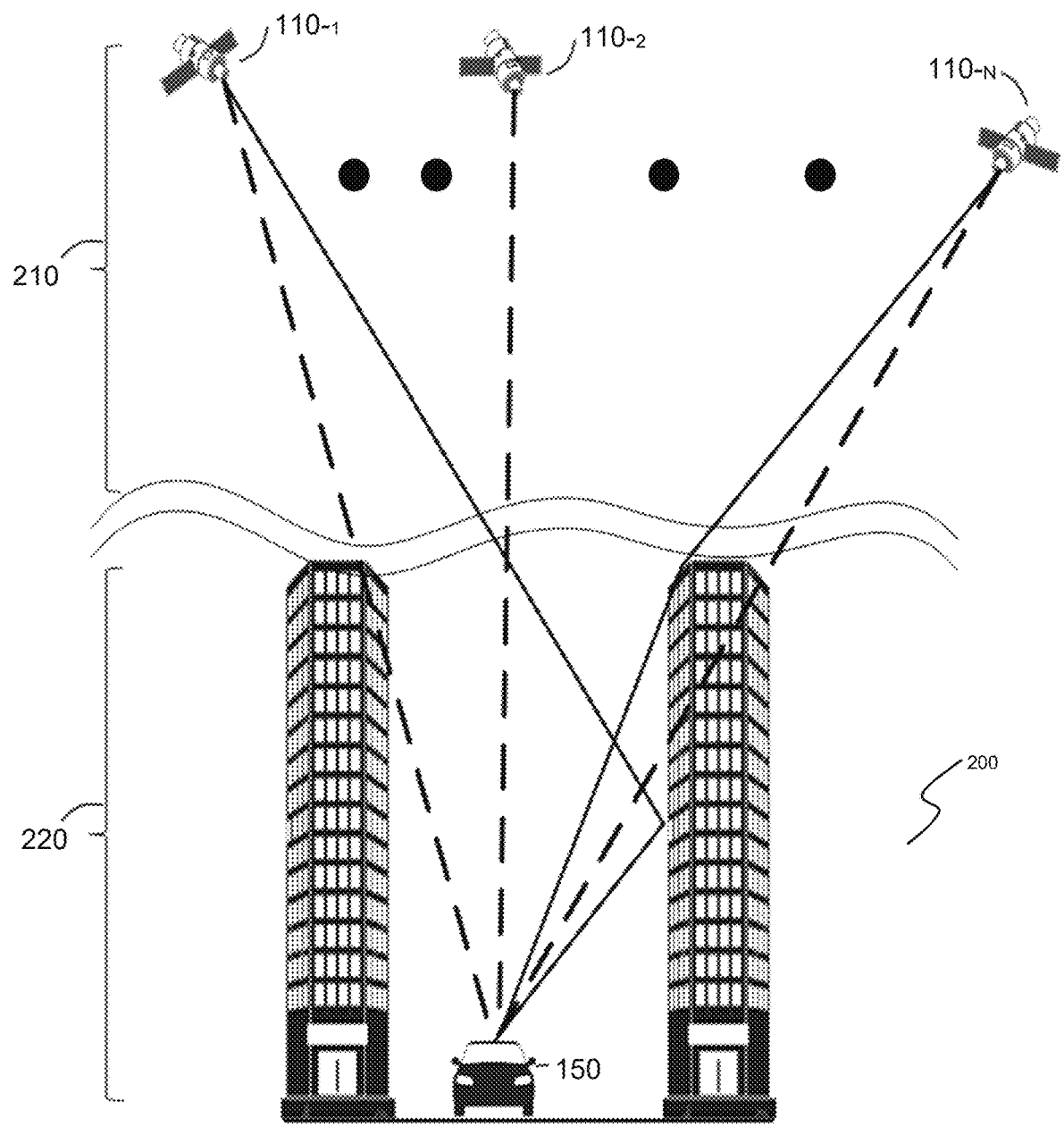
FIG. 2 is an example diagram showing propagation paths of signals from satellites to a GNSS device, according to an embodiment.

FIG. 2 is an example diagram 200 showing propagation paths of signals from satellites to a GNSS device 150, according to an embodiment. Here, signals from the satellites 1101-110N (hereinafter satellites 110 or satellite 110) are received at a GNSS device 150. The signal experiences several error sources along its path that aggregate and induce an error in receiver positioning. The error sources originating from the satellite 110 itself and errors induced when the signal travels through the atmosphere layers reside in the upper part 210 of the FIG. 3. For example, GNSS signals may be affected by Tropospheric and Ionospheric effects. Another set of errors referring as close vicinity to the GNSS device 150 are illustrated by buildings reside in the lower part 220 of FIG. 3.

In an embodiment, GNSS sensors 170, 172, 174, 176 measure ranges to the satellite 110 over one or more frequencies (L1, L2, L5) and over code phase measurements and carrier phase measurements. Here, a source of error may result from atmospheric effects, such as Ionospheric or Tropospheric delays. The Ionosphere delay is modeled by added delay to the code phase range while reducing delay, when carrier phase measurement is applied. Troposphere delay, on the other hand, induces delay to both code and carrier phase measurements. In some cases, code and phase measurements are combined such that the above-mentioned atmosphere effects are partially cancelled.

Another class of errors exists as the signal approaches the receiver at the GNSS device 150. This type of errors is associated with buildings hills, or other obstacles that might disrupt a clear line-of-sight signal propagation. Two classes of errors are identified from the errors listed above, including High Altitude errors (HA) that resides in the satellite sub-system (i.e., including the control segment monitoring the satellites), and in space as shown within the upper part 210. Overall, this class of errors sums up all the errors that occur starting from the satellite to the 'rooftop level' towards the GNSS device 150.

The second identified class of errors refers to low altitude (LA) error sources that are in a relatively close vicinity to the GNSS device 150 as shown within the lower part 220. A virtual border also exists between the two classes. In an urban environment, the border between the two segments stays in the range between 500 m-1000 m, while in rural environment where the sky is free from obstacles the low altitude segment may be of 10 m-20 m height. For both classes the error components are unique per satellite 110, whether it is HA or LA accumulation. The HA and LA values are different for each satellite.

The difference between the two classes also appears at the GNSS device 150. That is, HA-associated errors vary relatively slowly in time and space. First, the satellites orbits are at high altitude (i.e., ~20000 km) hence, their angular velocity is relatively slow, which indicates a slow change in range measurements. The change may be predicted, smoothed, and estimated based on previous measurements. Second, the atmosphere varies relatively slowly over day and night, so the changes in atmosphere induced delays (e.g., Ionospheric, Tropospheric) are also relatively slow in time (quasi static over tens of minutes). Further, the satellite imperfections change slowly over time (e.g., satellite clock bias). For example, where satellites ephemerides and clock models are delivered; satellites parameters describing these elements, (i.e., ephemeris data) are repeatedly transmitted via broadcast messages, with updates on an order of hours.

The LA error sources, on the other hand, changes quickly over time and space. For example, an error experienced at one point of the city due to its building structure can differ substantially from an error induced by another building structure located one block away. In addition, the slow angular velocity change of the satellite orbit for HA does not hold when the signal passes through the buildings canopy. Here, the change in the building-induced error occurs more rapidly due to reflections and refractions effects. Therefore, an accurate error model will be based on the above mentioned two clusters: An HA regime that varies in time and space and an LA regime that changes quickly in time and space. Here, a model to the first cluster-associated errors will be common to relatively large areas in the city due to its decoupled nature to the obstacles near the receiver. The second errors cluster, however, varies relatively rapidly in time and space, and therefore requires a careful handling as will be outlined below.

Figure 3:
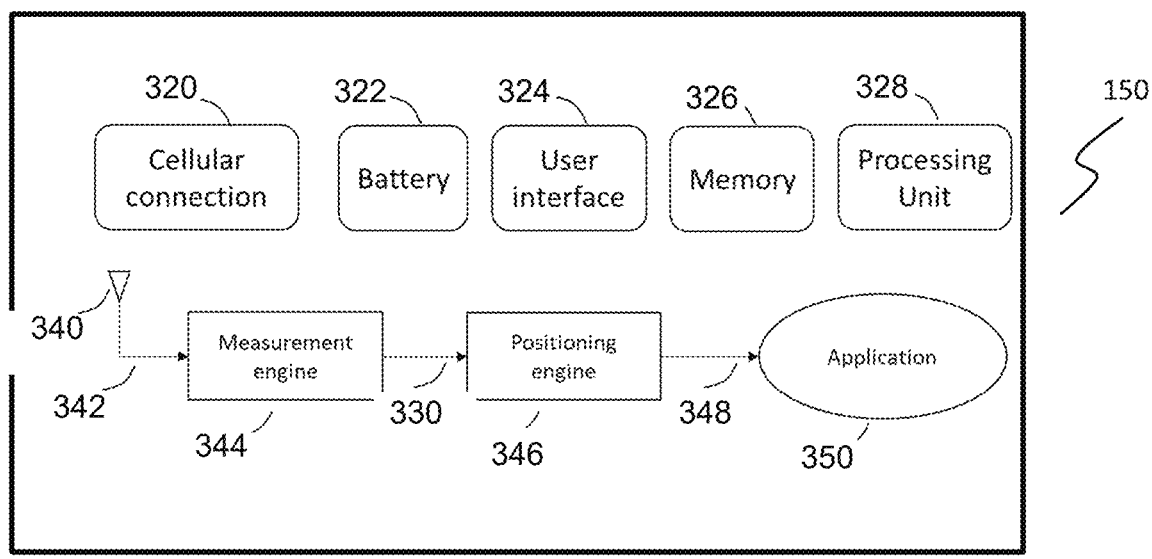
FIG. 3 is a detailed diagram of the GNSS device, according to an embodiment.

FIG. 3 illustrates a detailed diagram of the GNSS device 150, according to an embodiment. The GNSS device 150 includes cellular connection sub-system 320, which enables to connect in both directions each element in the GNSS device 150 with a remote entity. The sub-system 320 also has battery 322 for power supply, user interface 324 which in general can be bidirectional by having display and keyboard and/or touch panel and/or buttons. Further, the GNSS device 150 incorporates memory 326 and processing unit 328 elements which serve the system functions and communication between the system components.

In an embodiment, a GNSS receiver exists within the GNSS device 150 includes the following elements: antenna 340, antenna interface 342, measurement engine 344, interface connecting the output of the measurement engine to a positioning engine 346. The positioning engine 346 is responsible in turning a list of range measurements to satellites 110, the respective satellites locations and potentially additional calibration parameters into a receiver's (and therefore, the GNSS device's 150 location. Similarly, a positioning engine 346 is also responsible to turn range-rate measurements provided also by the measurement engine 344 through the interface 330 to receivers' velocity. Additionally, the positioning engine 346 estimates the receiver clock bias as well as few metrices indicating the quality of the resulting estimates (e.g., two-dimensional root mean squared error –2dRMS, three-dimensional root mean squared error –3dRMS, Geometric dilution of precision GDOP, etc.). In addition to the above, the outcome of the position estimate may also involve range and range rate residuals (i.e., estimation error of each received satellite range with respect to the position estimate).

A positioning engine 346 may select also a subset of the ranges (and range rates) reported by the measurements engine 344 to better control errors in order to better perform position computation. Also, a satellites selection algorithm may utilize additional measured parameters such as: satellites elevation, SNR, signal lock time, and so on. In general, position engine algorithms may change along operational time, and may involve heuristic algorithms and use of look-up table. Potentially, all the positioning engine outcomes are transmitted through an interface 348 to an application 350 that uses the position estimate for potentially: displaying, controlling, communicating with other entities, and so on.

The communication interfaces 330 and 348 and similar appearing in this disclosure which transfer digital communication in their essence, can potentially compress and correspondingly decompress the data transferred for the sake of communication efficiency, power consumption reduction, and so on. This observation holds also for wireless communication interfaces existing in this disclosure where data is transferred bidirectionally with remote entities.

It should be noted that this structure and respectively what follows, are not limited to cases where all the system components reside in the same hardware fixture. For example, the interface 330 can send the measurement data using the cellular connection 320 to a remote computing entity (e.g., computer center 140 in FIG. 1). Another option is sending a pre-processed measurements version such as by compression, early-stage calculation may also be done before sending it to the positioning engine 346.

In this example the positioning engine 346 may be implemented in the remote computing element computer center 140, and then the result of the position calculation is sent back using the cellular connection 320 to push it through interface 348 to the application entity 350. In other case, both the positioning engine and the application may reside in remote entity. Another potential case is where the application entity is implemented in a hybrid mode where part of it exists remotely and another part resides on the local hardware in the GNSS device 150.

A subset of the above mentioned GNSS based systems targeting accurate positioning applications exists in the form of GNSS-RTK (Real Time Kinematics) systems. In RTK systems two receiver's exchange carrier phase information where the first receiver is fixed in location and typically is termed 'base' or reference station (RS) and the second receiver is nomadic (usually termed as 'rover'). The system also has a constant communication link between the base and rover enabling an ongoing measurements exchange between the base and rover.

Figure 4:
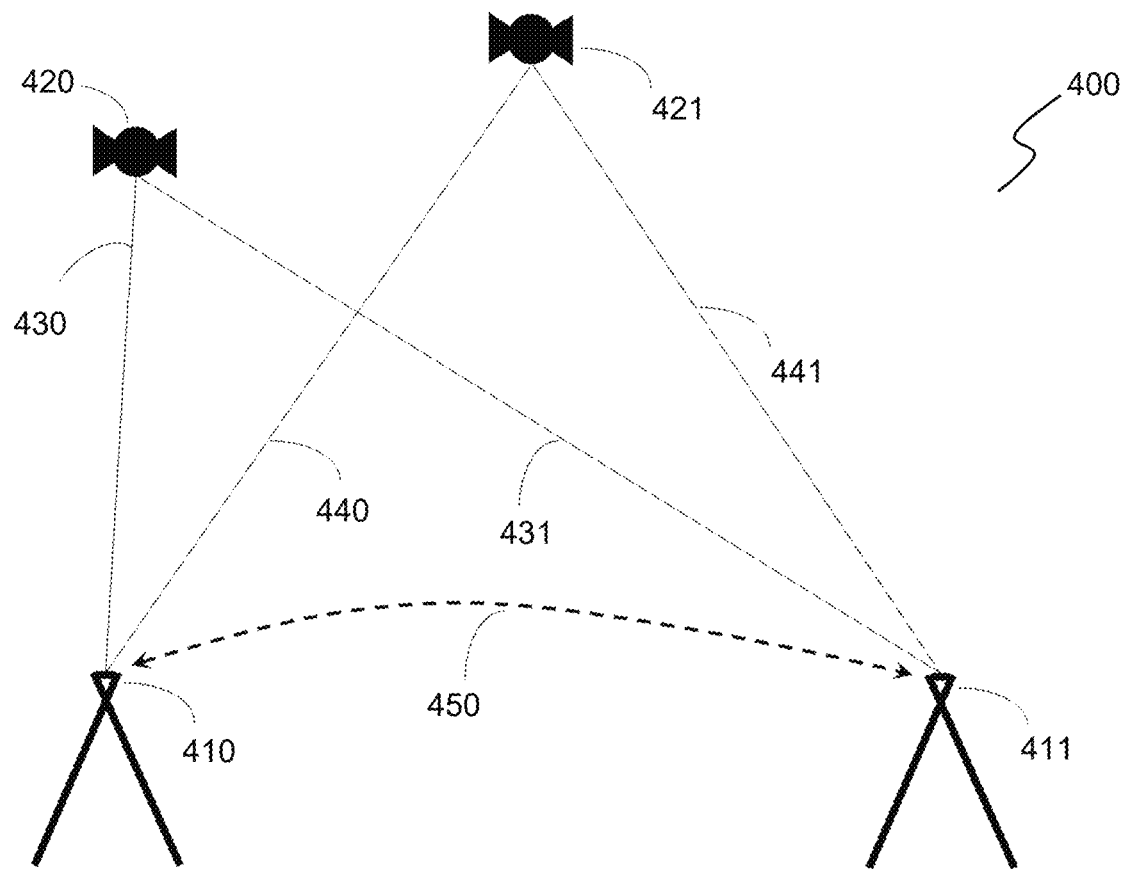
FIG. 4 is an example diagram of an RTK system, according to an embodiment.

FIG. 4 illustrates an example diagram 400 of an RTK system, according to an embodiment. Here, two receivers 410 and 411 exchange carrier phase information over a communication link 450. In some embodiments, combined dual frequency carrier phase measurements or also code phase measurements may involve in the information exchange between the base and the rover.

The receiver 410 may be referred to as the base receiver without loss of generality. By this notation it is assumed that the receiver antenna location is known to the system. The station 410 location information may be in the form of any standard coordination system (e.g., ECEF, [Latitude, Longitude, Altitude], etc.) over one or many geoids model (e.g., WGS84). This can be performed manually or autonomously by collecting data from the receiver and process it with or without additional aiding services (e.g., time, orbit, channel propagation correction services etc.). With regards to FIG. 1 the base receiver 410 must be one of any of the rooftop mounted sensors 130, 132 as it is assumed it experiences a clear sky (open sky) conditions.

Two orbiting satellites, also termed as SV (space vehicle), are indicated by 420 and 421 where the SV indicated by 421 is referred to as the reference satellite. The two receivers concurrently receive the two satellites where the range measurements (either single frequency, dual frequency, carrier phase, code phase or combination of those) from receiver 410 to satellites 420 and 421 are denoted by 430 and 440 respectively. Similarly, the range measurements from receiver 411 to satellites 420 and 421 are noted by 431 and 441, respectively.

The example configuration provided in FIG. 4 provides relative positioning to the base station and with the base global location coordinates this is straightforwardly extendable to both relative and global positioning accuracy level of few cm's provided that the reception conditions are with wide clear sky visibility (termed occasionally 'open sky').

A common practice in GNSS-RTK systems is double differencing of receiver carrier phase observables. The outcome of double differencing is an observation where atmosphere effects, satellites orbit and satellites clock offsets are cancelled out. In other words, error sources appearing along the signal path above a city rooftop are cancelled out. The underlined reason for the errors' cancellation is that common errors for both the rover and base appear to cancel out throughout the double differencing operation as shown in the sequel. Let us denote an i-th satellite received range by $R_i$ where it is composed out of the following elements:

$\rho_i$—indicates the true range between a receivers' antenna and an $i^{th}$ satellite ($SV_i$) antenna [m]

$I_i$—Ionosphere delay [m]

$T_i$—Troposphere delay [m]

$ORB_i$—range error due to satellite orbit offset [m] $C_i^{sat}$—Satellite clock offset times speed of light [m]

$C^u$—receivers clock bias times speed of light [m]

$MP_i$—range error induced by multipath and non-line of sight signal propagation [m]

$AMB_i$—phase ambiguity uncertainty [m] (exists only in carrier phase measurement)

$\varepsilon_i$—phase tracking loop error residual [m] (typically with standard deviation in the order of mms)

$\Delta R_i$—single differenced pseudo range with respect to a measured satellite range The above notation $\Delta(\cdot)$ denotes a single difference for the above-mentioned error components where one may observe that a receiver clock bias ($C_u$) cancels out due to being common to all satellites tracked by a receiver. $\nabla\Delta R_i$ is double differenced observation of two concurrent single differenced measurements taken in two receivers.

The value $\nabla\Delta(\cdot)$ denotes double differencing calculation between two receivers where each receiver performs a single differencing with respect to a predetermined reference satellite which is similar for both receiver's (e.g., denoted by $(\cdot)$ref). One may observe that the atmospheric satellite related errors (i.e., above rooftop, HA) are cancelled out through this operation where only receivers' and close vicinity error sources stays. It is important to note that if the above rooftop errors components are similar and holds for receivers that are relatively close in the order of few kms the HA are potentially cancelled out by double differencing.

The original measurement equations (for carrier phase) along with single differenced and double differenced observables are listed below:

$$R_i = \rho_i - I_i + T_i + ORB_i + C_i^{sat} + C^u + MP_i + AMB_i + \varepsilon_i \quad (1)$$

$$\Delta R_i = R_i - R_{ref} = \Delta\rho_i - \Delta I_i + \Delta T_i + \Delta ORB_i + \Delta C^{sat} + \Delta MP_i + \Delta AMB_i + \delta_i \quad (2)$$

$$\nabla\Delta R_i = R_{i,1} - R_{ref,1} - (R_{i,2} - R_{ref,2}) = \nabla\Delta P_i + \nabla\Delta MP_i + \nabla\Delta AMB_i + \xi_i \quad (3)$$

$$\nabla\Delta R_i - \nabla\Delta\rho_i = \nabla\Delta MP_i + \nabla\Delta AMB_i + \xi_i \quad (4)$$

In Equation (3) the second subscripts in R represents receiver indices indicating first and second receivers involved in the double differencing calculation. Equation (4) emphasizes that the residue in double differencing results in three elements: (a) double differenced multipath, (b) double differenced ambiguity term and (c) tracking loop noise, reflecting that the high elevation error sources (HA) in the signal measurement are practically cancelled out.

Note that the code observables have the form:

$$D_i = \rho_i + I_i + T_i + ORB_i + C_i^{sat} + C^u + MP_i + \epsilon_i \quad (5)$$

where $D_i$ denotes the i-th satellite code measured range with $\epsilon_i$ code tracking loop range error (e.g., typically with standard deviation in the order of few meters). It should be noted that code and phase mixtures single differencing and double differencing may also take place to remove common errors while trading off tracking errors (which are larger in code tracking) versus bias caused due to phase ambiguity (takes place in phase tracking).

Similarly, differencing can mix observables taken from different frequencies. A principal concern in RTK system which is addressed throughout this disclosure is the satellites visibility and channel propagation conditions per satellite. As RTK systems are very sensitive to MP interference it is proposed to use the street level mounted sensors 134, 136 in FIG. 1 for selection of a best subset of received satellites for the RTK solution.

Note that 'selecting a best visible satellites-set' is an ongoing analysis procedure that validates each satellite reception with respect to the street level sensor position along time. Each satellite is observed, tracked, and monitored by the set of street level sensors, while it is visible within the city skies, to generate a list of satellites that are best in stability and quality for usage with RTK solution in a per time and place manner. In this analysis the fact that the street level sensors are fixed in position is most valuable as well as the widespread deployment of the sensors across the urban space.

Figure 5:
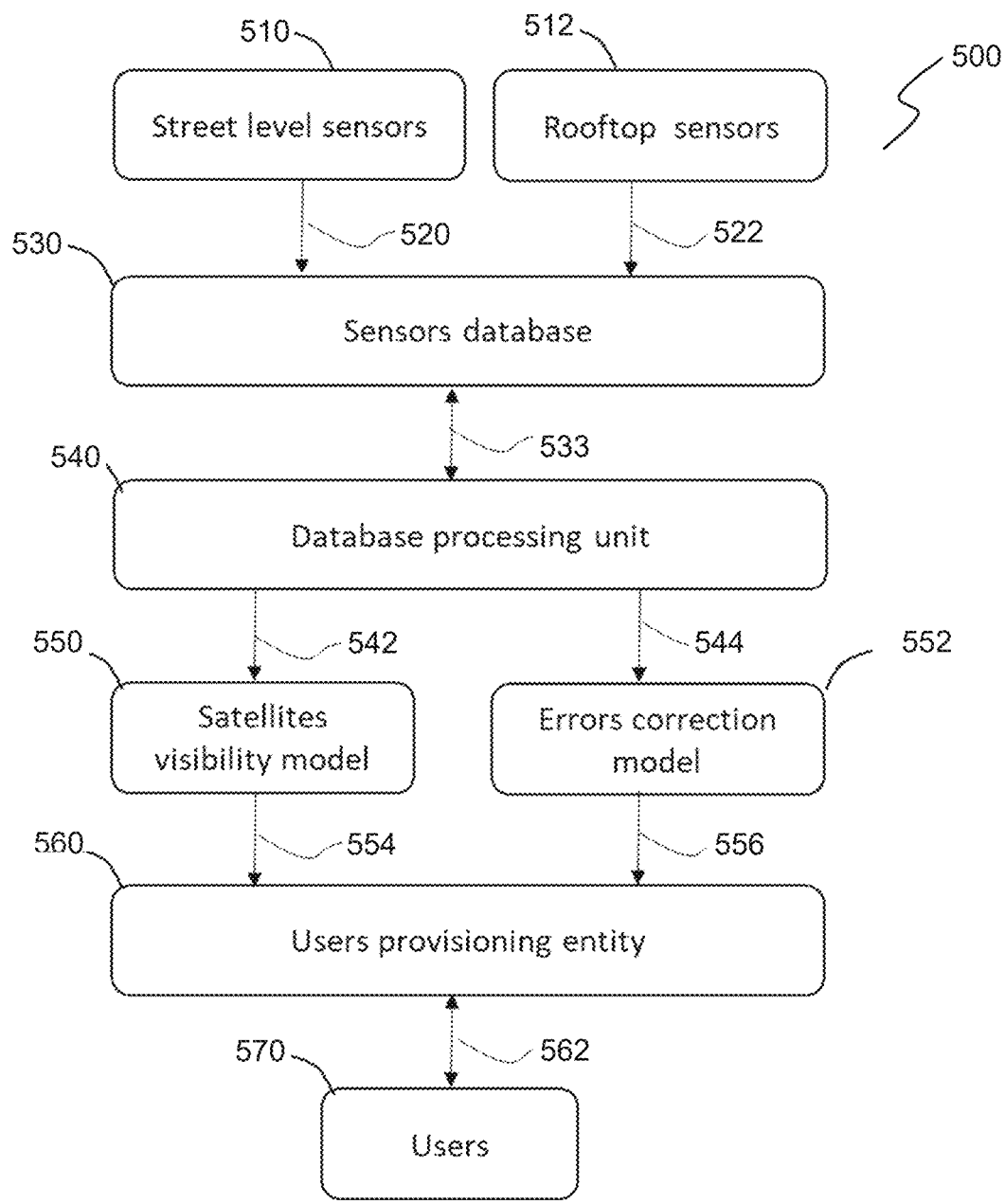
FIG. 5 is an example block diagram listing an urban GNSS correction system components and interconnection, according to an embodiment.

FIG. 5 is an example block diagram listing an urban GNSS correction system 500 components and interconnection, according to an embodiment. The system 500 includes street level sensors 510 and rooftop mounted sensors 512, which communicates with a sensors database 530 throughout data links 520 and 522 respectively. The communication may be carried out by wireline, fiber optics or wireless communication. The communication protocol and rate may vary in time and implementation. The sensors database 530 also processing capability and may be implemented with a single physical server or over virtual machine or over a third-party processing entity (e.g., single cloud provider, several cloud computing providers).

An additional option for the sensors server exists in the form mobile edge computing (MEC) owned by, e.g., cellular operator and resides within the deployed cellular network infrastructure. The database processing unit 540 has access to the sensors database with a communication link 533. The database processing unit 540 first collects data for each sensor to derive its location. In one option, the method may comprise derivation first of the above rooftop sensors data and refining it by external precise point positioning sources. Another approach is to physically measure one rooftop sensor location and derive the others with respect to the first sensor using high accuracy relative positioning techniques such as RTK (e.g., using double differencing Eq. (1-)).

Once the rooftop sensors 512 locations are derived, the street level sensor 510 locations are derived by collecting all the only clear LOS satellites sets to avoid errors caused by the urban landscape (i.e., MP). This process maybe time consuming and can employ precise point positioning (PPP) and/or RTK with selective satellites set according to their SNR, elevation and other provided tracking information (e.g., doppler, cycle slips indicator, MP indicator), as well as residual code and phase-based measurements that is collected and analyzed along the process duration.

This data collection and sensor location position calculation continues as long as the precision estimate certainty of the sensor location is over a predetermined threshold (e.g., 2d-Sigma=0.5 [m]). At a certain point of time, the sensor database processor 540 is configured to determine that a certainty level high enough for a sensor location and starting that point the sensor is defined as 'operational'. This process continues in parallel for a full deployed service over all the sensors connected to the system.

It should be noted that the data collection and processing may continue in updating and refining the sensors locations database also after the designated as 'operational' point in time. Once the sensors location is derived the sensors can start tracking satellites in view and classify those according to key performing indicators (KPIs) with respect to the sensor fix location. For example, code and phase range residuals in all available frequencies with respect to the sensor location are derived. Additional collectable parameters, e.g., SNR, azimuth, elevation, cycle slips are also valuable in a satellites' classification and error modelling.

The satellites classification as: (a) LOS satellites, (b) satellites with potentially low multipath errors and (c) satellites with large errors variations, is done repeatedly to build a policy of 'best-satellites-in-view' per sensor. As GNSS satellites are orbiting periodically the above-mentioned policy may further be projected (extrapolated) to predict what best set of satellites is going to be for use in a close future based on analysis performed in the past. In other words, as an example for GPS (NAVSTAR constellation) an analysis carried out in the past 12 hours may predict the best set of satellites to use in the next 12 hours (i.e., GPS satellites orbit period last ~12 hours).

This prediction is valuable in setting a best policy of which satellites to track and combine in an RTK solution which goes hand by hand with the rooftop mounted sensors 512. The policy eventually is provisioned to an end user (i.e., a nomadic station which is in close vicinity to a street level sensor location) which is a key element in this disclosure. Furthermore, satellites 110 that are in marginal error condition (case (b) above) may have a positioning model that will remove the expected (marginal) error induced due to the city landscape per satellite in the marginal tracking case.

Additionally, the rooftop mounted sensors 512 which are free of city landscape associated interference also provide measurements to satellites in view that are combined with the error's correction model. Both visibility and errors correction models are derived and stored per sensor in a processing element noted by 550 and 552 through interfaces 542 and 544 respectively. Both satellites visibility data and correction model information are transferred to users provisioning entity 560 through interfaces 554 and 556 respectively. The users of the system 570 interface with the users provisioning entity 560 through an interface 562 which is a bidirectional interface.

Additionally, a user location is required to better optimize the set of corrections parameters. Based on the users' location the best set of visible satellites is derived for the user and double differencing parameters are generated. The function of double differencing may take place at the user side 570, at the user provisioning entity 560 or in a hybrid approach partially conducted at the users' side 570 and partially at the provisioning entity 560. Another key element is a requirement of potentially scale up of the RTK solution to multiple rovers (e.g., order of thousands, tens thousands and more). This element is supported by the proposed block diagram as potentially multiple repeated calculations can be saved by sharing the correction data and the users' data at the provisioning entity. As an example, single differencing of the above rooftop sensors at a certain epoch is performed only once for all the city rovers instead of repeating essentially the same differencing thousands of times per each rover.

Figure 6:
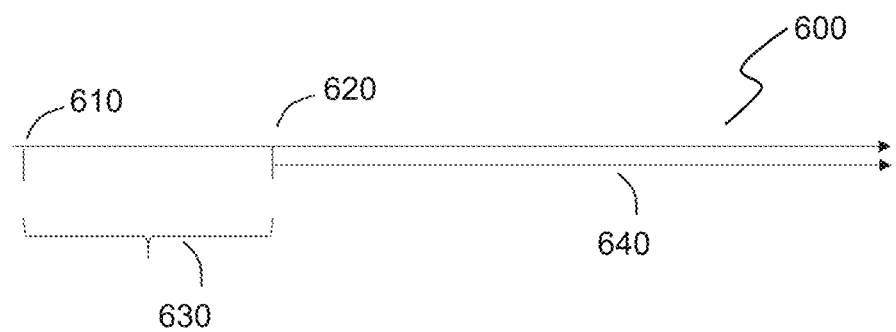
FIG. 6 is a time flow diagram for the operation of the system, according to an embodiment.

FIG. 6 illustrates a time flow 600 diagram for the operation of the system 500, according to an embodiment. An initiation time stamp 610 indicates the time where the data collection process starts. The time flow illustrates a single sensor for the sake of simplicity. The initial data collection process continues over a time period 630 until time stamp 620 where a sensor is set as 'operational' and the sensor location is known at high certainty level (e.g., 95%, 99% etc.) and a visible satellite set list is ready. Visible satellite set may be reported based on long-term data collection (e.g., hours, days) or short-term data collection (e.g., by tracking satellites for minutes with high validity for their clear sky reception condition at the sensor site). At time stamp 620 the service by the designated sensor is available for users over a time period 640.

It is important to note that the illustration in FIG. 6 shows a single sensor time flow, where in multiple sensors case it is expected that each senor initiation time will behave differently. Without loss of generality the service provision can be delivered once a minimal set of sensors are operational. This implies that new sensors may be added to the system through time stamp 640 with respect to other sensors time axis. Additionally, the operational system sensors are also being monitored and updated throughout the time stamp 640.

Figure 7:
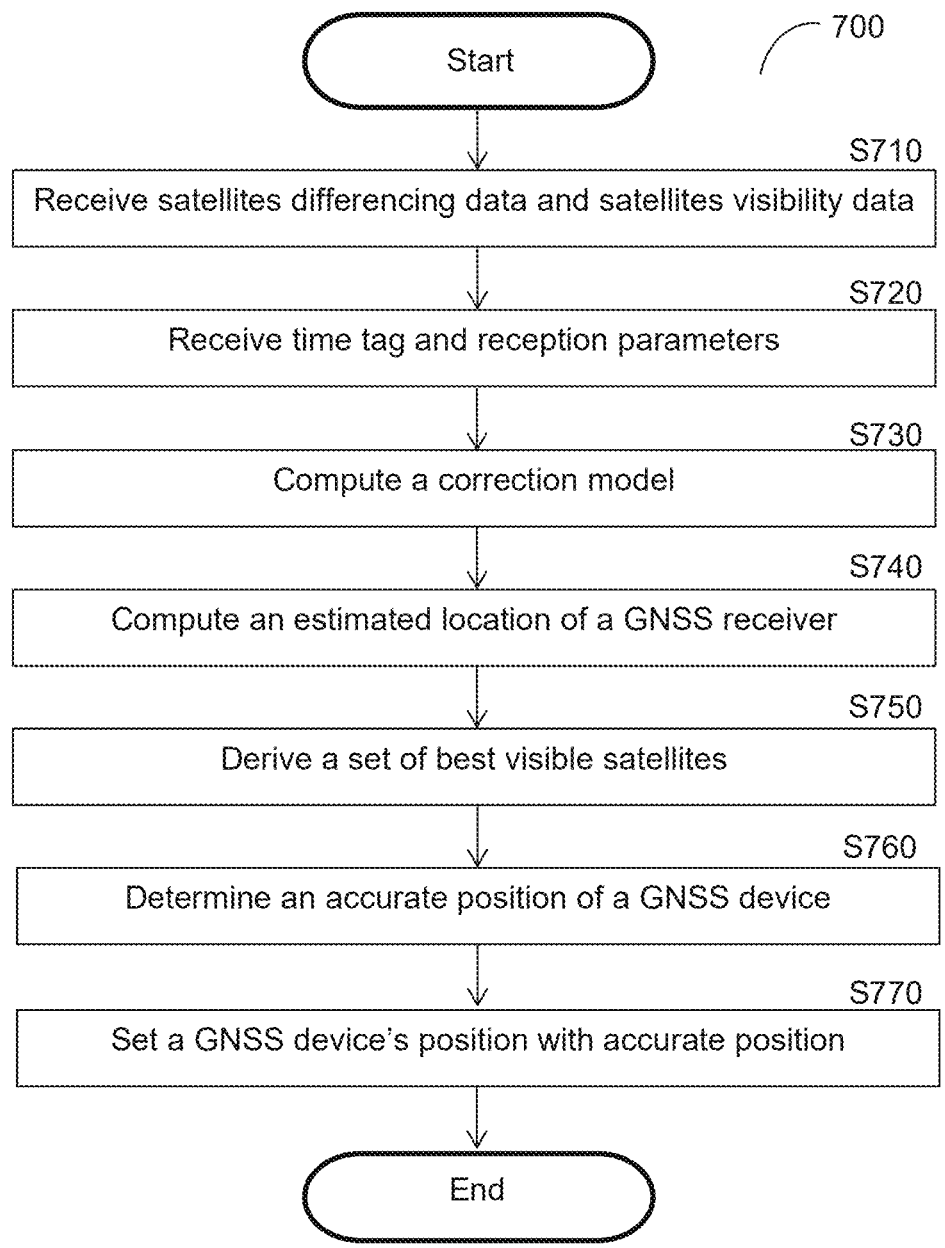
FIG. 7 is an example flowchart illustrating a method reducing environmental errors in GNSS signals in an urban environment according to an embodiment.

FIG. 7 shows an example flowchart 700 illustrating a method reducing environmental errors in GNSS signals in an urban environment according to an embodiment. The method provides an urban RTK positioning to a non-stationary GNSS receiver. Such receiver may be referred to a rover and maybe installed in a user device (also referred to as a GNSS device) may include, for example, a smartphone, a smartwatch, a laptop, a tablet computer, and so on. Also, a GPS device may also include a navigation system in a vehicle, a drone, a robot, and so on.

At S710, wide area satellites differencing data and satellites visibility data are received. The differencing data is provided by sensors with line-of-sight visibility, such as the rooftop sensors (e.g., rooftop sensors 130 and 132, FIG. 1). The satellites visibility data is received from street level sensors (e.g., sensors 134 and 136, FIG. 1). The street-level sensors from the received data are deployed in vicinity of the GNSS receiver. The satellites visibility and differencing may be real time measurements from the various sensors, historic data of past measurements, statistical data based on past measurements, and combination thereof.

At S720, a time tag and reception parameters are received from the GNSS receiver. The time tag and reception parameters related to reception of satellite signals by the GNSS receiver and can be received through, for example, an API. The time tag and reception parameters mentioned above parameters include originated measurements, such as code-phase range, carrier phase range, code phase range rate, carrier phase range rate, doppler frequency, SNR, multipath (MP) indicator, phase tracking state per satellite and receivers time-of-week (TOW). Other parameters may be broadcasted parameters decoded by the receiver, such as ionospheric information and satellites orbits and health information. It should be noted that S710 and S720 may be performed in parallel or at a different order.

At S730, a correction model is computed. The correction model includes a list of satellites with potentially single differencing with respect to a reference satellite selected from a list of best visible satellites. The correction may further include a list of visible satellites in the urban environment. This information may be set in tables, maps, modelling functions, or any combination thereof.

At S740, an estimated location of the GNSS receiver is computed. The estimated location can be computed based on data received from the rooftop sensors. In an embodiment, the estimated location can be received from the GNSS device. The estimated location can be relatively inaccurate (in the order of tens of meters), and therefore is expected to be reported in a form of a certain area or a city block level, and not necessarily a precise location. In some configurations, S740 also includes determining the velocity information (speed) of the GNSS receiver in the estimated location. It should be noted that the estimated location is required as the street level visibility derivation highly depends on a current location of the GNSS device.

At S750, satellites parameters (of a set best visible satellites are derived or determined based on the correction model, time tag, reception parameters, and estimated location. The set of best visible satellites are orbiting at a location of the GNSS receiver and using such satellites by the GNSS receiver would allow to GNSS receiver to accurate its location. The satellite parameters include, for example, code phase range, carrier phase range and doppler and scaling of such ranges.

In one embodiment, the best visible satellites set would be derived from the list of satellites determined based on the measurements (real-time or past measurements) of the closest street level sensor to the user's GNSS receiver. The best satellites can be derived by analyzing multiple parameters included in the measurements, such as SNR, MP indicator, cycle slips indicator, and so on as well as the set of satellites that provide the most accurate location for the sensors (rooftop and street level).

In an embodiment, the set of best satellites are also derived based on the history and/or statistics data collected in the past. For example, such date may include usability period of each satellite per sensor. The usability can be determined based on the derivation of the MP status.

In another embodiment, the set of best satellites can be derived by combining visibility data provided by a number of street-level sensors which are in close vicinity to the GNSS receiver. In yet another embodiment, the selected set of satellites can be further compared with the satellites received from the GNSS receiver, and additional satellites that are received by the user in better conditions can be added. This addition can be based on SNR, range measurement, MP indicator, or combination thereof.

It should be noted that if there are no sufficient number of proper quality satellites, in one embodiment, (based on the sensors measurements) a satellite that do not provide line-of-sight (LOS) conditions are proposed. This can be performed, for example, by computing the position of a sensor in the vicinity of the GNSS receiver using a selected set of satellites and compare the derived position to the sensor's known position.

In another embodiment, a satellite that is known to be close in conditions to LOS is selected based on past measurements, and corrections (based on a sensor in close vicinity to the GNSS receiver) are applied to that specific satellite that reduces the MP errors as well (according to the selected sensor).

At S760, using the satellite parameters of the best set of parameters a new accurate position of the GNSS device is determined. In an embodiment, the satellite parameters are fed to a positioning engine together with the time tag and reception parameters received from the GNSS receiver.

At S770, the new accurate position is sent back to a user (GNSS) device hosting the GNSS receiver. As noted above, a user device may include a smartphone, smartwatch, a GPS device in a vehicle, drone, robot, and so on. In an example, the accurate position is sent directly to an application installed in the user device, such that the application does not receive position information from the GNSS device's receiver. For example, a navigation application (app) installed in the user device would display the current location based on the received accurate position (determined as discussed above).

Figure 8:
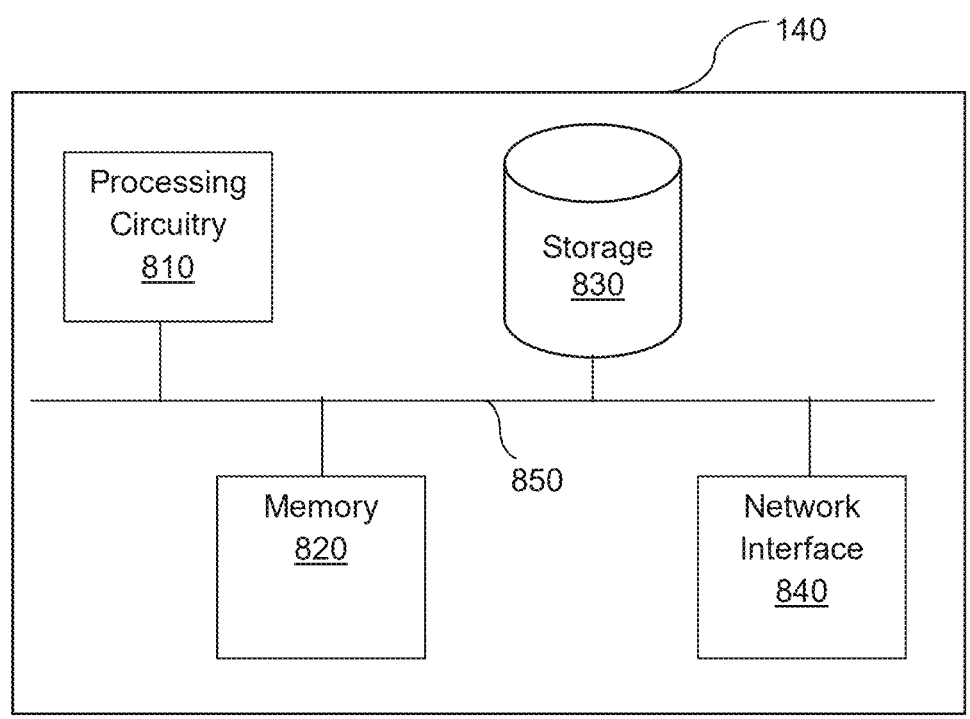
FIG. 8 is an example schematic diagram of a computing center 140 according to an embodiment.

FIG. 8 is an example schematic diagram of a computing center 140 according to an embodiment. The computing center 140 includes a processing circuitry 810 coupled to a memory 820, a storage 830, and a network interface 840. In an embodiment, the components of the computing center 140 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 820 may be volatile (e.g., RAM, etc.), non-volatile (e.g., ROM, flash memory, etc.), or a combination thereof. In one configuration, computer readable instructions to implement one or more embodiments disclosed herein may be stored in the storage 830.

In another embodiment, the memory 820 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, CD-ROM, Digital Versatile Disks (DVDs), or any other medium which can be used to store the desired information.

The network interface 840 allows the computer center 140 to communicate with the GNSS device 150 for the purpose of, for example, receiving data, sending data, and the like. Further, the network interface 840 allows the computer center 140 to communicate with GNSS device 150 for the purpose of collecting vehicle data.

It should be understood that the embodiments described herein are not limited to the specific architecture illustrated in FIG. 9, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code.

The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for providing an accurate position for a GNSS device in an urban environment, comprising:
  receiving differencing data and visibility data from a plurality of sensors, wherein the differencing data is received from at least two rooftop sensors and the visibility data is received from at least two street-level sensors located in a vicinity of the GNSS device;
  determining a correction model based on the received differencing data and the received visibility data;
  estimating a current location of the GNSS device;
  deriving satellite parameters of a set of best visible satellites based at least on the determined correction model and the estimated current location;
  determining an accurate position of the GNSS device based on derived satellite parameters of the set of best visible satellites and a current location measurement provided by a GNSS receiver in the GNSS device; and
  setting a location of the GNSS device based on the accurate position.

2. The method of claim 1, further comprising:
  receiving time tag and reception parameters from a GNSS receiver in the GNSS device; and
  using the time tag and reception parameters to derive satellite parameters.

3. The method of claim 1, wherein any of the differencing data and the visibility data includes real time measurements from the plurality of sensors, historic data of past measurements, and statistical data based on past measurements, wherein the past measurements includes any one of: a signal to noise (SNR) ratio; a code phase range; carrier phase range and doppler; a multipath indicator; and a cycle slips indicator.

4. The method of claim 3, further comprising:
  deriving satellite parameters based on at least one of historic data of past measurements, and statistical data based on past measurements.

5. The method of claim 3, further comprising:
  deriving the satellite parameters based on the real time measurements.

6. The method of claim 3, wherein deriving the satellite parameters further comprises:
  analyzing the measurements and a set of satellites that provides most accurate location for the plurality of sensors to derive the satellite parameters.

7. The method of claim 1, wherein the correction model includes a list of satellites with potentially single differencing with respect to a reference satellite selected out of a list of best visible satellites.

8. The method of claim 1, wherein the GNSS device is any one of: a smartphone; a smartwatch; a vehicle's navigation system; a robot's navigation system;
  and a drone's navigation system.

9. A non-transitory computer readable medium having stored thereon instructions for causing a processing circuitry to execute a process, the process comprising:
  receiving differencing data and visibility data from a plurality of sensors, wherein the differencing data is received from at least two rooftop sensors and the visibility data is received from at least two street-level sensors located in a vicinity of the GNSS device;

determining a correction model based on the received differencing data and the received visibility data;
determining a correction model based on the received differencing data and the received visibility data received from a plurality of sensors;
estimating a current location of the GNSS device;
deriving satellite parameters of a set of best visible satellites based at least on the determined correction model and the estimated current location;
determining an accurate position of the GNSS device based on derived satellite parameters of the set of best visible satellites and a current location measurement provided by a GNSS receiver in the GNSS device; and
setting a location of the GNSS device based on the accurate position.

10. A system for providing an accurate position for a GNSS device in an urban environment, comprising:
a processing circuitry; and
a memory, the memory containing instructions that, when executed by the processing circuitry, configure the system to:
receive differencing data and visibility data from a plurality of sensors, wherein the differencing data is received from at least two rooftop sensors and the visibility data is received from at least two street-level sensors located in a vicinity of the GNSS device;
determine a correction model based on the received differencing data and the received visibility data;
estimate a current location of the GNSS device;
derive satellite parameters of a set of best visible satellites based at least on the determined correction model and the estimated current location;
determine an accurate position of the GNSS device based on derived satellite parameters of the set of best visible satellites and a current location measurement provided by a GNSS receiver in the GNSS device; and
set a location of the GNSS device based on the accurate position.

11. The system of claim 10, wherein the system is further configured to:
receive time tag and reception parameters from a GNSS receiver in the GNSS device; and
use the time tag and reception parameters to derive satellite parameters.

12. The system of claim 10, wherein any of the differencing data and the visibility data includes real time measurements from the plurality of respective sensors, historic data of past measurements, and statistical data based on the past measurements, and wherein the past measurements include any one of: measurements includes any one of: a signal to noise (SNR) ratio; a code phase range; carrier phase range and doppler; a multipath indicator; and a cycle slips indicator.

13. The system of claim 12, wherein the system is further configured to derive satellite parameters based on at least one of historic data of past measurements, and statistical data based on past measurements.

14. The system of claim 12, wherein the system is further configured to derive the satellite parameters based on the real time measurements.

15. The system of claim 12, wherein the deriving of the satellite parameters further comprises:
analyzing the measurements and a set of satellites that provides the most accurate location for the plurality of sensors to derive the satellite parameters.

16. The system of claim 10, wherein the correction model includes a list of satellites with potentially single differencing with respect to a reference satellite selected out of a list of best visible satellites.

17. The system of claim 10, wherein the GNSS device is any one of: a smartphone, a smartwatch; a vehicle's navigation system; a robot's navigation system; and a drone's navigation system.

* * * * *